Dec. 19, 1961  C. W. KEUFFEL ET AL  3,013,464
OPTICAL LEVEL
Filed May 5, 1955  2 Sheets-Sheet 1
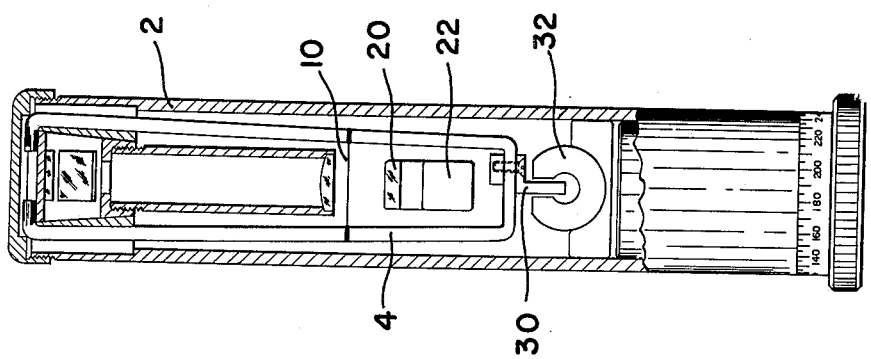
Fig. II
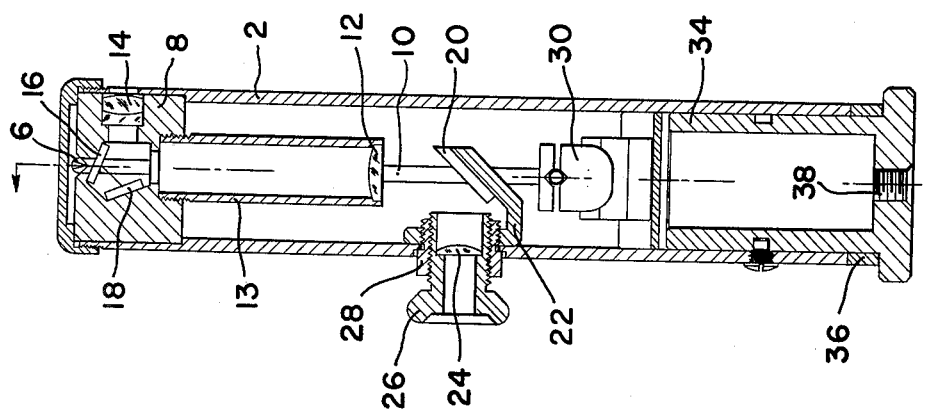
Fig. I
INVENTOR.
CARL W. KEUFFEL
BY ALLISTER L. BAKER
ATTORNEY

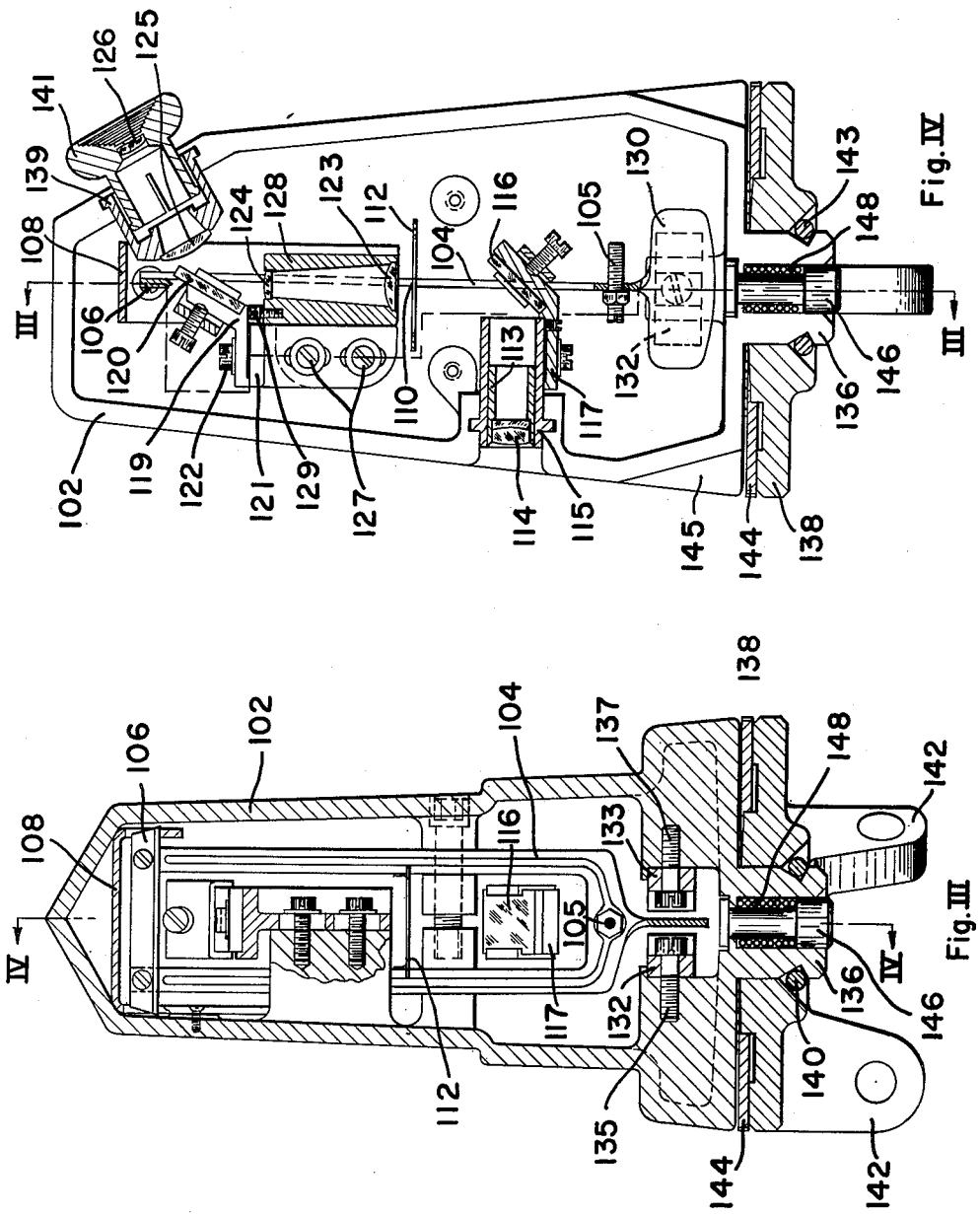

3,013,464
OPTICAL LEVEL
Carl W. Keuffel, Bernardsville, and Allister L. Baker, Denville, N.J., assignors to Keuffel & Esser Company, Hoboken, N.J., a corporation of New Jersey
Filed May 5, 1955, Ser. No. 506,112
6 Claims. (Cl. 88—1)

This invention relates to an optical instrument for establishing a horizontal line of sight. More specifically, the invention relates to the type of instrument which is known in the surveying instrument art as a level. In particular, the level of the present invention is of the self-compensating type; the level line of sight is automatically determined by means of a pendulum device.

Pendulum means have already been used for the same general purpose. For example, Patent No. 1,891,641 of December 20, 1932, to Wenzel Habel discloses an artificial horizon for sextants which uses a hair line mounted on an arm which is actuated by a pendulum. In this patented construction, a stationary hair line is also provided and it is necessary to align the two hair lines to bring a line of sight to the level position. Although the present invention makes use of a pendulum, it is based upon a different principle than the Habel construction and utilizes a much more simple practical construction which will be apparent from the description which follows:

The principal objects of the present invention are to provide a simple relatively inexpensive level for surveying which is provided with a pendulum compensating device so that the instrument need not be held perfectly level in order to obtain accurate readings.

These and other objects of the invention and the means for their attainment will be more fully understood after reading the following description taken in conjunction with the attached drawings in which:

FIG. I is a view in sectional elevation of one embodiment of the invention.

FIG. II is a view in sectional elevation taken along the line II—II of FIG. I and looking in the direction of the arrows.

FIG. III is a view in sectional elevation of a second embodiment of the invention.

FIG. IV is a view in sectional elevation taken along the line IV—IV of FIG. III and looking in the direction of the arrows.

Referring to FIGURES I and II, the new level is made up of a telescope mounted in a generally vertical enclosure or supporting body 2. A pendulum 4 is free to swing in this enclosure. The pendulum is mounted on knife edge pivots 6 which fit into a V notch in the support 8 mounted in the top of the enclosure 2. The knife edge pivots 6 permit the pendulum to swing in a vertical plane perpendicular to the knife edges. This vertical plane is parallel to the line of sight of the instrument. An index mark 10 is provided on the pendulum 4. This is in the form of a crosswire stretched between the two upright portions of the pendulum.

An objective lens 14 images light from any target along the line of sight through the collecting lens 12 to superimpose it upon the index mark 10. The collecting lens 12 is mounted at the bottom of the tube 13 which is threaded into the support 8. The objective lens 14 and the collecting lens 12 are considered as a combination when calculating the focal length of the objective lens. The objective lens 14 is held in the support 8 to mount it in the wall of the enclosure 2 so that its optical line of sight projects horizontally outward through the wall of the enclosure 2 parallel to the plane in which the pendulum 4 swings.

Reflecting means which in the embodiment of FIGS. I and II is made up of two reflectors 16 and 18 mounted in the form of a penta prism and mounted within the enclosure 2 carried by the support 8 direct the light from the objective 14 vertically past the index mark 10 so that the objective 14 (and collective lens 12) form an image of the target superimposed on the index mark 10.

A reflector 20 is carried on a mount 22 secured inside the enclosure 2 as shown to direct the light passing the index mark 10 through the eyepiece 24 which in this embodiment is a single lens eyepiece mounted in the wall of the enclosure 2. The eyepiece 24 is carried in mount 26 which in turn is threaded into mount 28 secured in the wall of the enclosure 2. The mount 26 may be turned within the mount 28 to focus the eyepiece 24 on the index mark 10. The combination of the three reflectors 16, 18 and 20 and the single lens eyepiece 24 gives an erect image. However this image is reverted from side to side.

A vane 30 of high electrical conductivity material, such as copper or aluminum, is carried at the lower end of the pendulum 4. This vane 30 swings between the poles of a permanent magnet 32 which effectively damps the motion of the pendulum 4 so that it will come to rest quickly under the action of gravity.

The radius $r$ from the axis about which the pendulum swings (in this case the knife edges 6) to the index mark 10 is made equal to the image distance of the objective (in this case combination of objective lens 14 and collecting lens 12) and the center of gravity of the pendulum is adjusted so that as long as the pendulum is free to take its true equilibrium position under the action of gravity, points imaged by the objective 14 against the index mark 10 will lie on a level line extending outward from the instrument from the center of the objective 14. If the object being observed were at infinity, the image distance would equal the equivalent focal length of the objective combination. However, in any practical use of the instrument this is never the case since any real object will be closer than infinity which will make the image distance longer than the equivalent focal length. In order to insure that objects at various distances are reasonably in focus, the objective combination is adjusted to a focal distance from the reticle so that objects at some intermediate distance are sharply in focus and objects at long and short distances are only slightly out of focus.

The tubular enclosure 2 can be turned around the bearing 34 to project the level line of sight in any direction in a horizontal plane. A protractor scale is provided on the surface of the collar 36 which in conjunction with an index mark provided near the bottom edge of the outside surface of the enclosure 2 will indicate the direction of the horizontal line of sight in azimuth. The collar 36 may be turned on the bearing 34 to change the zero position of the protractor scale.

A threaded opening 38 is provided in the bottom of the bearing 34 so that the bearing may be attached to a suitable support such as a camera tripod.

The embodiment of FIGS. III and IV differs from the embodiment of FIGS. I and II in that the light passing through the objective is directed upward in the embodiment of FIGS. III and IV and downward in the embodiment of FIGS. I and II. However, it will be realized that the principles of construction of the two embodiments are otherwise the same.

Referring to FIGS. III and IV the vertical enclosure 102 is in the form of a die cast shape instead of the simple tube used in the embodiment of FIGS. I and II. The enclosure 102 is actually made up of two die castings which are joined together along the line IV—IV. The pendulum 104 is free to swing within the enclosure 102. The pendulum 104 is carried on a knife edge pivot 106 which is mounted in a sheet metal support 108 provided with a V support for both ends of the knife edge pivot 106.

Although knife edge pivots are shown in this embodiment and the embodiment of FIGS. I and II, it should be realized that other forms of pivoting means such as a thin flexible strip could also be used.

The index mark 110 is carried on the pendulum 104. In this embodiment, the index mark takes the form of a wire carried in a frame 112 which in turn is mounted between the uprights of the pendulum.

The objective lens 114 carried in mount 113 slides within the tube 115 for adjustment of the lens focus. The tube 115 is mounted in an opening provided in the wall of the enclosure 102 by means of a ring provided on the outside of the tube 115 which fits into an annular recess die cast into the two halves of the enclosure 102.

Reflecting means which in this embodiment takes the form of a single reflector 116 directs the light which passes through the objective 114 upward past the index mark 110. The reflector 116 is cemented to a mount 117 and also held by a strap as shown. The mount 117 is adjustably mounted to the tube 115 within the enclosure 102. As in the case of the embodiment of FIGS. I and II, the radius r from the knife edge 106 to the index mark 110 is equal to the image distance of the objective lens 115. The center of gravity of the pendulum 104 is adjusted by means of the screw 105 so that the line of sight is level when the pendulum is in its equilibrium position under the action of gravity.

In the embodiment of FIGS. III and IV a four lens eyepiece is used made up of the lenses 123, 124, 125 and 126. This eyepiece may be mounted vertically for viewing the image through the top of the enclosure 102. However, in the construction as shown a reflector 120 is mounted between the second and third lenses 124 and 125 of the four lens eyepiece to bend the line of sight so that the image may be viewed from a convenient angle as shown. The reflector 120 is secured on to the mount 119 by cement and by means of the strap as shown. The mount 119 is secured to the support 121 by the screw 122 and the support 121 is fastened inside the enclosure by screws 127. The support 121 is also provided with a tubular portion 128 which holds the eyepiece lenses 123 and 124. The screw 129 is used for adjusting the angle of the mirror 120.

The lens 125 is held in mount 139 which is provided with a ring of enlarged diameter fitting in an annular opening cast in both halves of the enclosure 102. Lens 126 is carried by the mount 141 which may be focused with respect to the mount 139 by means of a conventional spiral cam and pin focusing device. Focusing of the lens 126 brings the index mark 110 sharply in view for the observer. The combination of the four lens eyepiece and the two reflectors 116 and 120 gives an erect image. If the mirror 120 is omitted, an inverted image is obtained.

The vane 130 of a material of high electrical conductivity is carried at the bottom of pendulum 104 and swings between two permanent magnets 132 and 133. These are mounted so that their opposite poles will face each other. They are secured to the lower part of the casting 102 by the screws 135 and 137. Although magnetic damping is shown both in this embodiment and in the embodiment of FIGS. I and II it will be apparent that other forms of damping such as air damping may be used.

The lower part of the casting forming the enclosure 102 forms a journal 136 which can be turned within the bearing 138 to orient the line of sight in azimuth. The journal 136 is held in the bearing 138 by the retaining spring 140. The bearing 138 is provided with three lugs 142 extending downward. Each of the lugs 142 is provided with a hole for the attachment of a tripod leg which acts as a support for the instrument. The bearing 138 carries a protractor scale 144 which in conjunction with an index mark provided near the lower end of the enclosure 102 in the recessed position 145 (FIG. IV) indicates the orientation of the instrument in azimuth. The protractor scale 144 may be turned about the bearing 138 to change the zero position.

A plunger 146 is provided in a central bore provided in the journal 136. The plunger 146 is normally held down by the spring 148 as shown so that the pendulum 104 is free to swing. However one of the tripod legs (not shown) can be provided with a projection which will engage the lower end of the plunger 146 when the tripod legs are brought together as in carrying the instrument. This will force the plunger 146 upward causing it to lift the pendulum off the knife edge pivots and protects the pendulum and the pivots when the instrument is not in use.

Although the objective is shown mounted in the wall of the enclosure in both embodiments it will be realized that the objective may be mounted within the enclosure with its optical axis vertical. In this case the reflector which receives the light from the target would be mounted above the objective in the embodiment of FIGS. I and II and below the objective in the embodiment of FIGS. III and IV.

Having thus described the invention, what is claimed is:

1. An optical instrument for determining a level line of sight, comprising a supporting body, an eyepiece mounted on said supporting body, a pair of reflecting means mounted on said body in vertically spaced relation, one of said reflecting means bending the level line of sight into a vertical path, said other reflecting means bending the vertical path of sight into said eyepiece, a pendulum mounted on said body with the pivotal axis thereof closely adjacent the upper of said reflecting means and the other end of the pendulum closely adjacent the lower of said reflecting means, whereby the pendulum axis substantially coincides with said vertical path of sight, said pendulum being approximately the length of the vertical path between said reflecting means, an index mark mounted on said pendulum and movable therewith, and an objective mounted on said supporting body and cooperating with said reflecting means providing an optical system having a focal plane transverse to said vertical path, said index mark lying in said focal plane and crossing the vertical path of sight between said pair of reflecting means, whereby said index mark is visible through the eyepiece and establishes a level line of sight.

2. An optical instrument for determining a level line of sight, comprising a supporting body rotatable about an axis substantially normal to the plane of said level line of sight, an eyepiece mounted on said supporting body, a pair of reflecting means mounted on said body in vertically spaced relation, one of said reflecting means bending the level line of sight into a vertical path, said other reflecting means bending the vertical path of sight into said eyepiece, a pendulum mounted on said body with the pivotal axis thereof closely adjacent the upper of said reflecting means and the other end of the pendulum closely adjacent the lower of said reflecting means, whereby the pendulum axis substantially coincides with said vertical path of sight, said pendulum being approximately the length of the vertical path between said reflecting means, an index mark mounted on said pendulum and movable therewith, and an objective mounted on said supporting body and cooperating with said reflecting means providing an optical system having a focal plane transverse to said vertical path, said index mark lying in said focal plane and crossing the vertical path of sight between said pair of reflecting means, whereby said index mark is visible through the eyepiece and establishes a level line of sight as said supporting body is rotated.

3. An optical instrument for determining a level line of sight, comprising a supporting body, an eyepiece mounted on said supporting body, a pair of reflecting means mounted on said body in vertically spaced relation, one of said reflecting means bending the level line of sight into a vertical path, said other reflecting means bending the vertical path of sight into said eyepiece, a pendulum mounted on said body with the pivotal axis thereof closely adjacent the upper of said reflecting means and the other end of the pendulum closely adjacent the lower of said reflecting means, whereby the pendulum axis substantially coincides with said vertical path of sight, said pendulum being approximately the length of the vertical path between said reflecting means, an index mark mounted on said pendulum and movable therewith at a radius $r$ from the pivotal axis of the pendulum, and an objective mounted on said supporting body and cooperating with said reflecting means providing an optical system having a focal plane transverse to said vertical path, the image distance $s$ of said objective equalling the radius $r$, said index mark lying in said focal plane and crossing the vertical path of sight between said pair of reflecting means, whereby said index mark is visible through the eyepiece and establishes a level line of sight.

4. An optical instrument for determining a level line of sight, comprising a supporting body, an eyepiece mounted on said supporting body, a pair of reflecting means mounted on said body in vertically spaced relation, the upper of said reflecting means bending the level line of sight downward into a vertical path, the lower of said reflecting means bending the vertical path of sight into said eyepiece, a pendulum mounted on said body with the pivotal axis thereof closely adjacent the upper of said reflecting means and the other end of the pendulum closely adjacent the lower of said reflecting means, whereby the pendulum axis substantially coincides with said vertical path of sight, said pendulum being approximately the length of the vertical path between said reflecting means, an index mark mounted on said pendulum and movable therewith, and an objective mounted on said supporting body and cooperating with said reflecting means providing an optical system having a focal plane transverse to said vertical path, said index mark lying in said focal plane and crossing the vertical path of sight between said pair of reflecting means, whereby said index mark is visible through the eyepiece and establishes a level line of sight.

5. An optical instrument for determining a level line of sight, comprising a supporting body, an eyepiece mounted on said supporting body, a pair of reflecting means mounted on said body in vertically spaced relation, the lower of said reflecting means bending the level line of sight upward into a vertical path, the upper of said reflecting means bending the vertical path of sight into said eyepiece, a pendulum mounted on said body with the pivotal axis thereof closely adjacent the upper of said reflecting means and the other end of the pendulum closely adjacent the lower of said reflecting means, whereby the pendulum axis substantially coincides with said vertical path of sight, said pendulum being approximately the length of the vertical path between said reflecting means, an index mark mounted on said pendulum and movable therewith, and an objective mounted on said supporting body and cooperating with said reflecting means providing an optical system having a focal plane transverse to said vertical path, said index mark lying in said focal plane and crossing the vertical path of sight between said pair of reflecting means, whereby said index mark is visible through the eyepiece and establishes a level line of sight.

6. An optical instrument for determining a level line of sight, comprising a supporting body, an eyepiece mounted on said supporting body, a pair of reflecting means mounted on said body in vertically spaced relation, one of said reflecting means bending the level line of sight into a vertical path, said other reflecting means bending the vertical path of sight into said eyepiece, a pendulum mounted on said body with the pivotal axis thereof closely adjacent the upper of said reflecting means and the other end of the pendulum closely adjacent the lower of said reflecting means, whereby the pendulum axis substantially coincides with said vertical path of sight, said pendulum being approximately the length of the vertical path between said reflecting means, an index mark mounted on said pendulum and movable therewith, an objective mounted on said supporting body and cooperating with said reflecting means providing an optical system having a focal plane transverse to said vertical path, said index mark lying in said focal plane and crossing the vertical path of sight between said pair of reflecting means, whereby said index mark is visible through the eyepiece and establishes a level line of sight, and damping means adjacent to said pendulum for bringing said pendulum to rest quickly.

References Cited in the file of this patent

UNITED STATES PATENTS

| 1,533,941 | Otto | Apr. 14, 1925 |
| 2,313,204 | Morelle | Mar. 9, 1943 |
| 2,533,686 | Peterson | Dec. 12, 1950 |
| 2,557,340 | Carbonera | June 19, 1951 |
| 2,679,181 | Keuffel et al. | May 25, 1954 |
| 2,890,616 | Bruscaglioni | June 16, 1959 |

FOREIGN PATENTS

| 369,130 | Great Britain | Mar. 17, 1932 |

OTHER REFERENCES

"I Moderni Livelli Autolivellanti" (Bruscaglioni), Atti della Fondazione G. Ronchi, vol. 9, No. 4, July 1954, pages 259–272, pages 263–266 relied upon.